(12) United States Patent
Engl et al.

(10) Patent No.: US 7,818,471 B2
(45) Date of Patent: Oct. 19, 2010

(54) INPUT/OUTPUT MODULE FOR A PROGRAMMABLE CONTROLLER

(75) Inventors: Werner Engl, Luhe-Wildenau (DE); Stefan Grosser, Schnaittenbach (DE); Gerald Hirmer, Mantel (DE); Mario Maier, Ensdorf (DE)

(73) Assignee: Siemens Aktiengesellschaft, Munich (DE)

( * ) Notice: Subject to any disclaimer, the term of this patent is extended or adjusted under 35 U.S.C. 154(b) by 496 days.

(21) Appl. No.: 11/527,209

(22) Filed: Sep. 26, 2006

(65) Prior Publication Data

US 2007/0094434 A1 Apr. 26, 2007

(30) Foreign Application Priority Data

Sep. 28, 2005 (EP) .................................. 05021188

(51) Int. Cl.
*G06F 3/00* (2006.01)

(52) U.S. Cl. ............................. 710/19; 710/18; 710/15

(58) Field of Classification Search .................... 710/19, 710/15, 18

See application file for complete search history.

(56) References Cited

U.S. PATENT DOCUMENTS

| | | | |
|---|---|---|---|
| 5,731,595 A * | 3/1998 | Clark | 250/551 |
| 5,777,557 A | 7/1998 | Fayfield | |
| 5,818,216 A * | 10/1998 | MacDonald | 324/96 |
| 6,016,017 A * | 1/2000 | Kadanka et al. | 307/64 |
| 6,411,532 B1 | 6/2002 | Piron | |
| 6,605,957 B1 | 8/2003 | Piron et al. | |
| 6,833,979 B1 * | 12/2004 | Knapp et al. | 360/322 |
| 7,475,495 B2 * | 1/2009 | Chiles et al. | 34/443 |

* cited by examiner

*Primary Examiner*—Niketa I Patel
*Assistant Examiner*—Zachary K Huson

(57) ABSTRACT

An input/output module for a programmable controller is provided. The input/output module has a digital input channel, and in order to prevent power losses previously incurred internally within the module, an electrical source is provided internally within the module for evaluating the status of a sensor connected to the digital input channel. The module receives no electrical energy via the digital input channel but outputs it. A reduction is thus achieved in the power loss incurred internally within the module. A method for operating an input/output module for a programmable controller is also provided.

16 Claims, 3 Drawing Sheets

INPUT/OUTPUT MODULE FOR A PROGRAMMABLE CONTROLLER

CROSS REFERENCE TO RELATED APPLICATIONS

This application claims priority of European application No. 05021188.7 filed Sep. 28, 2005, which is incorporated by reference herein in its entirety.

FIELD OF THE INVENTION

The invention relates to an input/output module for a programmable controller comprising at least one signaling contact functioning as a digital input for connecting a sensor which is external to the module at least to the signaling contact. An input/output module is deemed here to refer to any module in a programmable controller which is defined and provided for connecting external peripherals, that is e.g. actuators and/or sensors.

BACKGROUND OF THE INVENTION

The term input/output module is used hereinbelow to refer either to the individual module having respectively a connection facility for external peripherals such as e.g. switches, limit monitors, electrical, hydraulic or pneumatic units and such like, or, particularly in the case of so-called compact programmable controllers, i.e. devices in which the control and processing functionality and the facilities for connecting peripherals are combined in one device, to the entire programmable controller.

Programmable controllers of the type cited in the introduction, particularly in an embodiment as modular programmable controllers, are generally known e.g. in the form of programmable controllers which are supplied by the applicant under the SIMATIC brand. From these programmable controllers, input/output modules fashioned as an individual module, in particular input modules or combined input/output modules, as a concrete example of an input/output module, are also known.

The invention relates specifically to an input/output module comprising at least one signaling contact functioning as a digital input. Such an input/output module constitutes accordingly an input/output module with digital input functionality. Such modules are frequently fashioned with a plurality, e.g. 16 or 32, of digital inputs and are designated digital input modules accordingly. The digital input module is thus a special form of an input/output module with exclusively digital input functionality. Besides these, mixed forms, that is e.g. digital input/output modules or digital input and analog input modules, can also have at least one signaling contact functioning as a digital input. The peripheral devices covered by the invention are correspondingly also collectively referred to in short below by the term digital input module or input module, the key criterion being invariably the at least one signaling contact functioning as a digital input.

The input modules known in the prior art are based on the principle that a current flows into the module via a digital input, that is, the input channel linked to the signaling contact, when a connected sensor is activated. In the simplest case, the sensor is recognized as activated when a current is flowing. Correspondingly, the sensor is recognized as deactivated when there is no current flowing. However, even where a sensor is deactivated, a current can flow into the module so the status of the sensor is normally recognized from the magnitude of a voltage, preferably from the exceeding of certain predefined or predefinable threshold values for the voltage which is required for driving a current via the signaling contact.

This standard principle is not quite optimal insofar as a power loss arises inside the module as a result of the input current. In standards specified under IEC 61131-2 for voltage and current values at digital inputs (type 1: high signal in the voltage range 15V . . . 30V, input current at high signal: min. 2 mA; type 2: high signal in the voltage range 11V . . . 30V, input current at high signal: min. 6 mA), the power loss in an input channel of the above-mentioned second type, which is also suitable for connecting so-called BEROs (contactlessly operating sensors), amounts to at least $30V \times 6 mA = 180 mW$. The power loss also varies depending on the electrical connection of the input channel. In the case of an input channel realized by means of a passive circuit, a power loss of $30V \times 16.4 mA = 492 mW$ occurs. The preceding numerical example (power loss: 180 mW) relates to an "active circuit" with a so-called current sink.

The power loss shown above by way of example arises, moreover, in each input channel, i.e. in the case of a module comprising 32 input channels, the power loss amounts to a total of $32 \times 180 mW = 5.76 W$ ($32 \times 492 mW = 15.74 W$). As regards a desirable reduction in the power loss, however, it is not possible to reduce the magnitude of the input currents, since it is not otherwise possible to comply with the requirements under IEC 61131-2.

Furthermore, it must be taken into account that efforts are being made to develop 64-channel modules. By extrapolation, power losses of $64 \times 180 mW = 11.5 W$ and $64 \times 492 mW = 31.5 W$ will arise respectively for the implementation of all inputs with an active and passive circuit.

The power loss must be dissipated from the module and, as a result, necessitates a certain size for the module. Since the sizes theoretically required run contrary to the trend toward miniaturization, a derating of modules is frequently carried out, i.e. the user has to take care to ensure that only a certain predetermined number of input channels is activated simultaneously (permanently). In unfavorable cases, this may mean that e.g. only half of the inputs available can actually be used.

SUMMARY OF THE INVENTION

The object of the invention is accordingly to reduce the power loss occurring at the module end so as thereby to be able to realize e.g. modules of a reduced size or modules of a size which remains at least essentially the same, in which, however, all, or at least a greater number of, the input channels can be used simultaneously.

The invention proposes, in order to avoid or at least reduce the above-mentioned disadvantages and in order to achieve the above-mentioned object or to achieve individual aspects of the above-mentioned object, an input module with a power-loss optimized digital input or such a power-loss optimized digital input. According to the invention, an input/output module of the type specified in the introduction comprises to this end an electrical source provided internally within the module for evaluating the status of the sensor.

The invention proceeds here from the recognition that, whenever a digital input receives current, i.e. current is input into the module via the signaling contact due to a voltage being applied externally (over the sensor), a power loss occurs within the module. According to the invention, this principle is reversed. The module no longer functions as a current sink but comprises internally within the module an electrical source and thus functions in particular as a current source. The module is thus enabled itself to output electrical energy, e.g. in the form of current and/or voltage. It generates in practice an output power from the power input via the signaling contact(s) and prevents or at least reduces by this means the occurrence of power loss in the area of the module. The evaluation of the status of the connected sensor is likewise effected by means of the electrical source provided internally within the module.

The power loss arising in the area of the input/output module can thus be reduced considerably. The reduction in power loss is accompanied by an opportunity to reduce the size of the input/output module, as only the reduced power loss inside the input/output module has to be dissipated. In addition, the reduced power loss opens up, where the size of the input/output module remains approximately the same, the provision of additional channels for connecting further sensors, the reduction in the power loss by the invention being approximately inversely proportional to the possible reproduction of individual channels on the input/output module.

Advantageous embodiments of the invention are the subject matter of the dependant claims.

The electrical source is preferably provided for emitting an electrical current via the signaling contact in order to supply a sensor which can be connected to the signaling contact and the grounding contact. The special feature here lies firstly in connecting the sensor to the signaling and the grounding contact, whereas in previously known modules of the type specified in the introduction external sensor technology is always connected to the signaling and to a power supply contact.

The input/output module preferably has a power supply contact for connecting a supply voltage in order to supply in particular the electrical source provided internally within the module.

It is particularly preferred that the electrical source provided internally within the module to be fashioned as a clocked constant-current source. This enables yet another further reduction in the power loss incurred at the module end since the clocked constant-current source is distinguished in being more efficient than other electrical sources and, due to the increased degree of efficiency, the power loss which is incurred at the clocked constant-current source is reduced accordingly. Reduced power loss at the clocked constant-current source and thus also reduced power loss inside the input/output module is in turn accompanied by advantages in terms of a reduced-size design being achievable or, where the design is essentially the same, a greater number of channels being achievable.

It is particularly preferred for the electrical source, particularly in its embodiment as a clocked constant-current sink, to comprise processing functionality such that the status of the sensor connected to the signaling contact is recognized from a voltage which is required in operating mode for driving a current via the signaling contact. In detail, taking a switch as the simplest form of a sensor, conditions arise, according to which a higher voltage is required for driving the current via the signaling contact when the switch is open, while only a low voltage is required for driving the same constant current when the switch is closed, i.e. approximating to a short-circuit between grounding contact and signaling contact. The voltage required in each case or the voltage generated in each case by the clocked constant-current source for maintaining the constant current can be recognized by means of the processing functionality assigned to the electrical source. Recognition of the respective voltage can indicate directly the status of the sensor, i.e. e.g. "switch closed" or "switch open".

It is also preferred that, depending on the status of the sensor which can be recognized by means of the processing functionality of the electrical source, an evaluation branch is triggered which is provided for transferring the recognized status of the sensor to a processing unit. The status of the sensor recognized through the processing functionality is fed for further processing, which is usually carried out by a so-called central unit of the programmable controller, for further exploitation of the process signal recognized in this way. This can, if the processing functionality of the electrical source also comprises means for storing the recognized status, by effected directly by interrogating these storage means. If the processing functionality of the electrical source does not comprise such storage means, signaling of the recognized status to a suitable device having such storage means is required. Preferably, the evaluation branch provided for transferring the recognized status has an optocoupler so that a metallic isolation is achieved inside the input/output module between a first part of the circuit, which part can be influenced externally via the power supply, the signaling and the grounding contact, and a second part of the circuit, independent thereof, for data processing and/or transmission. Here, the second part of the circuit is provided in particular for evaluating the respectively recognized states of the individual channels and/or for handling the transmission of data, which through combination of the states that can be recorded in a module accrue to form corresponding data words, via a bus in accordance with the respective bus protocol.

The evaluation branch preferably also comprises a display element, e.g. an LED, by means of which the recognized status of the connected sensor can be signaled in a manner known in the art on an external side of the input/output module.

Corresponding to the input/output module described above, the invention also relates to a method for operating such an input/output module, wherein the electrical source outputs a current via the signaling contact and wherein evaluation of the status of a sensor connected to the signaling contact and the grounding contact is made from a voltage which the electrical source has to apply in order to drive the current via the signaling contact.

Here, recognition of the status of the sensor connected to the electrical source is carried out preferably by means of a processing functionality assigned to the electrical source from the level of the voltage required for driving the current via the signaling contact, transfer of the recognized status to a processing unit being effected by means of the processing functionality. To transfer the recognized status to the processing unit, depending on the status an evaluation branch which comprises in particular an optocoupler or an optocoupler and a display element is activated or deactivated.

An exemplary embodiment of the invention will be explained in detail below with the aid of the drawings. Items or elements corresponding to one another are labeled with the same reference characters in all the figures.

DETAILED DESCRIPTION OF THE DRAWINGS

Figure 1:
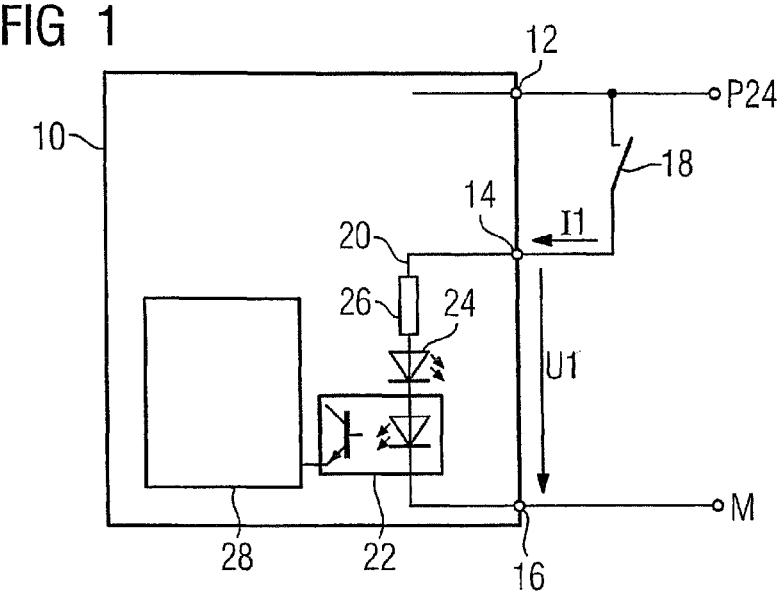
FIG. 1 shows a circuit diagram of a digital input module according to the prior art.

FIG. 1 shows a simplified circuit diagram of a digital input module 10 as an example of an input/output module. The digital input module 10 comprises a power supply contact 12, a signaling contact 14 and a grounding contact 16. The power supply contact 12 is provided for connecting a supply potential, e.g. P24, the supply potential being provided both for supplying a sensor 18 connected between power supply contact 12 and signaling contact 14 and for supplying the electrical circuit elements, including inter alia an optocoupler 22, an LED as an example of a display element 24 and a resistor 26, provided in an evaluation circuit 20. The optocoupler 22 enables the transfer of a recognized status of the sensor 18 to a processing unit 28 connected downstream.

The evaluation branch 20 extends internally within the module between the signaling contact 14 and the grounding contact 16. As long as the sensor 18, a simple switch in the example shown, is open, no current flows via the evaluation circuit 20. As soon as the switch is closed, i.e. the status of the sensor 18 changes, the potential which previously applied at the power supply contact 12 is also applied at least approximately at the signaling contact 14 and a current flow occurs (marked I1 in FIG. 1) via the evaluation branch 20. Inside the module 10, a power loss is thus incurred in the evaluation branch 20, which power loss, given normal dimensioning of the components 20, 22, 24 contained in the evaluation branch 20, amounts to $I1 \times U1 = 6$ mA$\times 30$V$= 180$ mW. Since this power loss arises individually for each channel, the result in a 32-channel module is 32 times this power loss, that is about 5.76 W.

In order to remove this power loss, a defined minimal size has previously been provided for the module 10. It is also customary to specify either additionally or alternatively a so-called derating for the module 10, i.e. that the user of the module must take care to ensure that only a certain number of the channels available on the module may be (permanently) active, i.e. may generate dissipation heat. This overall situation has been recognized by the inventors as being unsatisfactory and contrary to the increasing trend toward the miniaturization of devices and individual modules in automation.

In order to be able to achieve a small size for the modules 10, the power loss of the digital inputs would have to be reduced. At the same time, however, the input currents must not be reduced as otherwise specified standards with regard to voltage level and current strength will not be complied with. The inventors have now recognized that in the case of digital input modules 10 because of the current consumption, that is, the current flowing into the digital input due to a voltage applied externally, a power loss occurs inside the module which, contingent upon principles, cannot be further reduced because neither the externally applied voltage nor the current consumption can be reduced without contravening the relevant standards, in particular IEC 61131.2. It is therefore provided according to the invention that the principle previously underlying all input/output modules with digital input functionality be reversed such that the module 10 outputs current and voltage.

Figure 2:
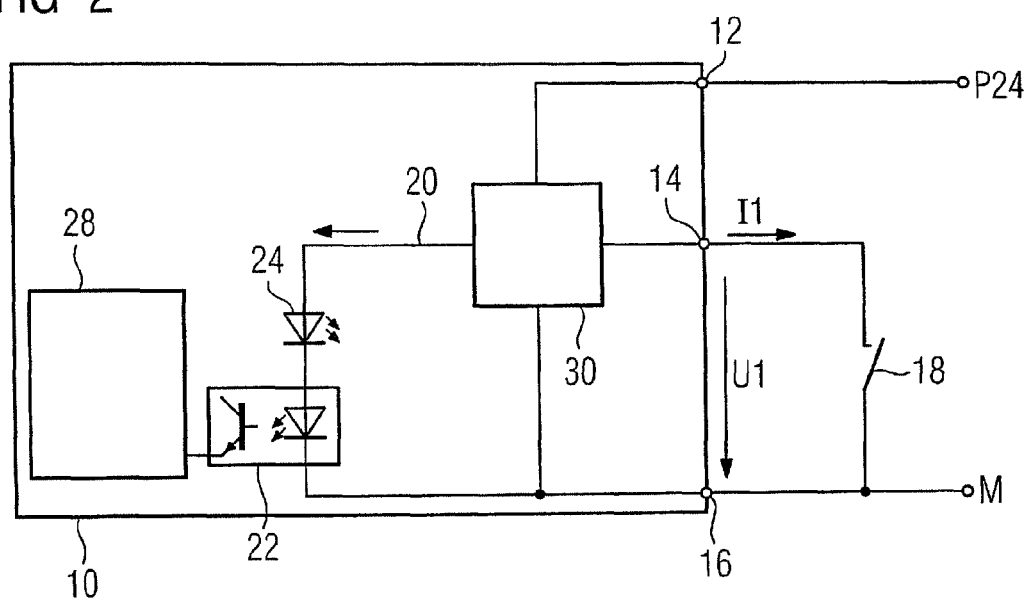
FIG. 2 shows a circuit diagram of a digital input module according to the invention comprising a simple sensor and FIG. 3 shows a circuit diagram of a digital input module according to the invention comprising a special sensor.

In this regard, FIG. 2 shows a simplified circuit diagram of a digital input module 10 according to the invention. Analogously to the situation in FIG. 1, the digital input module 10 according to the invention has a power supply contact 12, a signaling contact 14 and a grounding contact 16. The evaluation branch 20 comprising optocoupler 22 and display element 24 is connected downstream of an electrical source 30 which is fashioned in particular as a clocked constant-current source. The sensor 18, in the example shown again fashioned as a simple switch, is, in contrast to the situation in FIG. 1, no longer connected to the power supply contact 12 and the signaling contact 14 but to the signaling contact 14 and the grounding contact 16. The power supply 12 serves essentially only to provide a supply voltage for supplying in particular the electrical source 30. The electrical source 30 outputs a current I1 via the signaling contact 14. As long as the switch shown as a sensor 18 is open, the electrical source 30 has to generate a certain, comparatively high voltage in order to maintain the current I1. As long as the switch is closed and thus the potential M applied at the digital input, that is, at the signaling contact 14, only a considerably reduced voltage is still required in order to maintain the same current I1. An evaluation of the status of the sensor 18 is thus possible with the aid of the electrical source 30, in particular such that the status of the sensor 18 connected to the signaling contact 14 can be recognized from a voltage which is required in operating mode for driving the current I1 via the signaling contact 14.

In operating mode, the module 10 supplies the current I1 at the digital input, that is, at the signaling contact 14. This current I1 is regulated such that it remains constant. In order to maintain the current I1, only a very low voltage U1 is required where a switch is connected as a sensor 18. The module 10 supplies e.g. to the switch a current I1 of 6 MA at a voltage U1 of 100 mV. This results in a power of 6 mA$\times 0.1$V$=0.6$ mW. This power is generated inside the module 10 by the electrical source 30, preferably in its embodiment as a clocked constant-current source, from the supply voltage (P24) which is applied at the power supply contact 12. If this generation is carried out in a clocked constant-current source with an efficiency of e.g. 70%, only the power loss of $(0.3/0.7) \times 0.6$ mW$=0.26$ mW is still incurred in the module 10. Thus, inside the module 10, e.g. a power loss of only 0.26 mW per digital input occurs. In a 32-channel module, the result is a power loss of $32 \times 0.26$ mW$=8.3$ mW. In comparison to this, in modules according to the principle always pursued in the prior art previously, a power loss of 5.67 W results.

Figure 3:
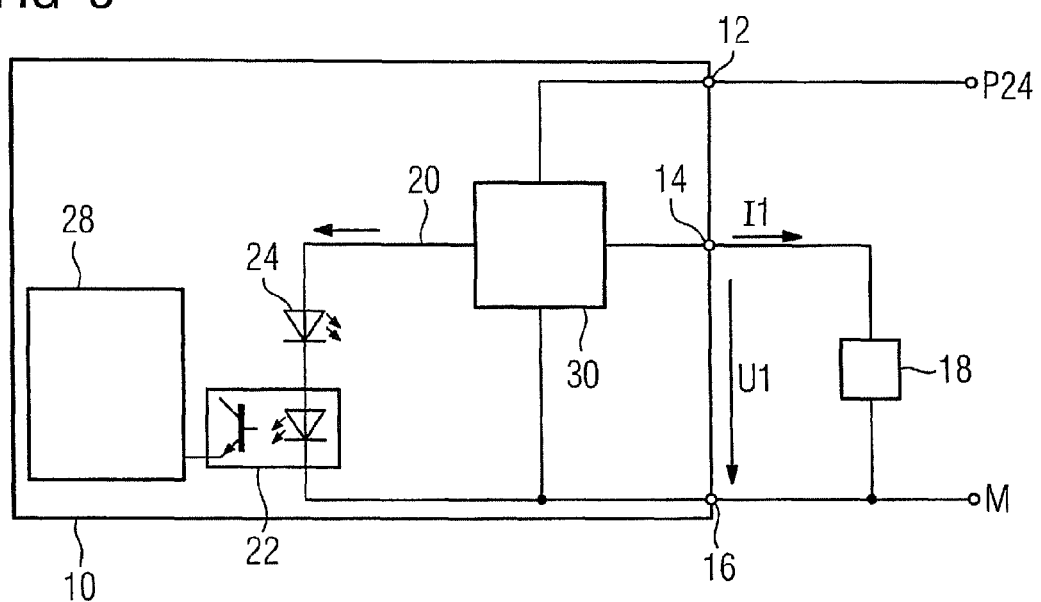

FIG. 3 shows a digital input module 10 which essentially corresponds to the diagram in FIG. 2, a so-called "2-wire BERO" being shown schematically in a simplified manner as the sensor 18. Such sensors 18 represent the main reason why a minimal current must constantly flow via the signaling contact, namely the current which is required to operate the BERO. The maximum power loss thus always occurs whenever such BEROs and not simple switches are connected as sensors 18. These BEROs require, e.g. when in the "open" state, a current of about 2 mA to operate at a voltage of about 30V In the "closed" state, the module 10 limits the current to 6 mA. A voltage of about 10V that applies at the BERO.

In the closed state, a BERO allows a high current I1 to flow. Here, the current is limited internally within the module to a predetermined or predeterminable maximum value, e.g. 6 mA. The residual voltage U1 at the BERO can in this case amount to up to 10V In the open state, the BERO allows only a small current I1 to flow (e.g. maximum 2 mA). This current I1 is used as an operating current for supplying the electronics of the BERO. The current I1 is in this case not limited by the module 10. The voltage U1 at the BERO is then as great as the supply voltage P24 being applied at the power supply contact 12 (maximum 30V).

In both cases, a power loss of 2 mA$\times 30$V$=60$ mW or 6 mA$\times 10$V$=60$ mW is generated at the BERO. This power is generated inside the module by the electrical source 30, preferably in its embodiment as a clocked constant-current source. If this power is generated with an efficiency of e.g.

70%, a power loss of (0.3/0.7)×60 mW=26 mW is incurred in the module 10. Inside the module 10, the power loss occurs for each digital input. In a 32-channel module 10, a power loss of 32×60 mW=823 mW would arise. In modules according to the previous principle, by comparison, a power loss of 5.67 W would arise.

Figure 4:
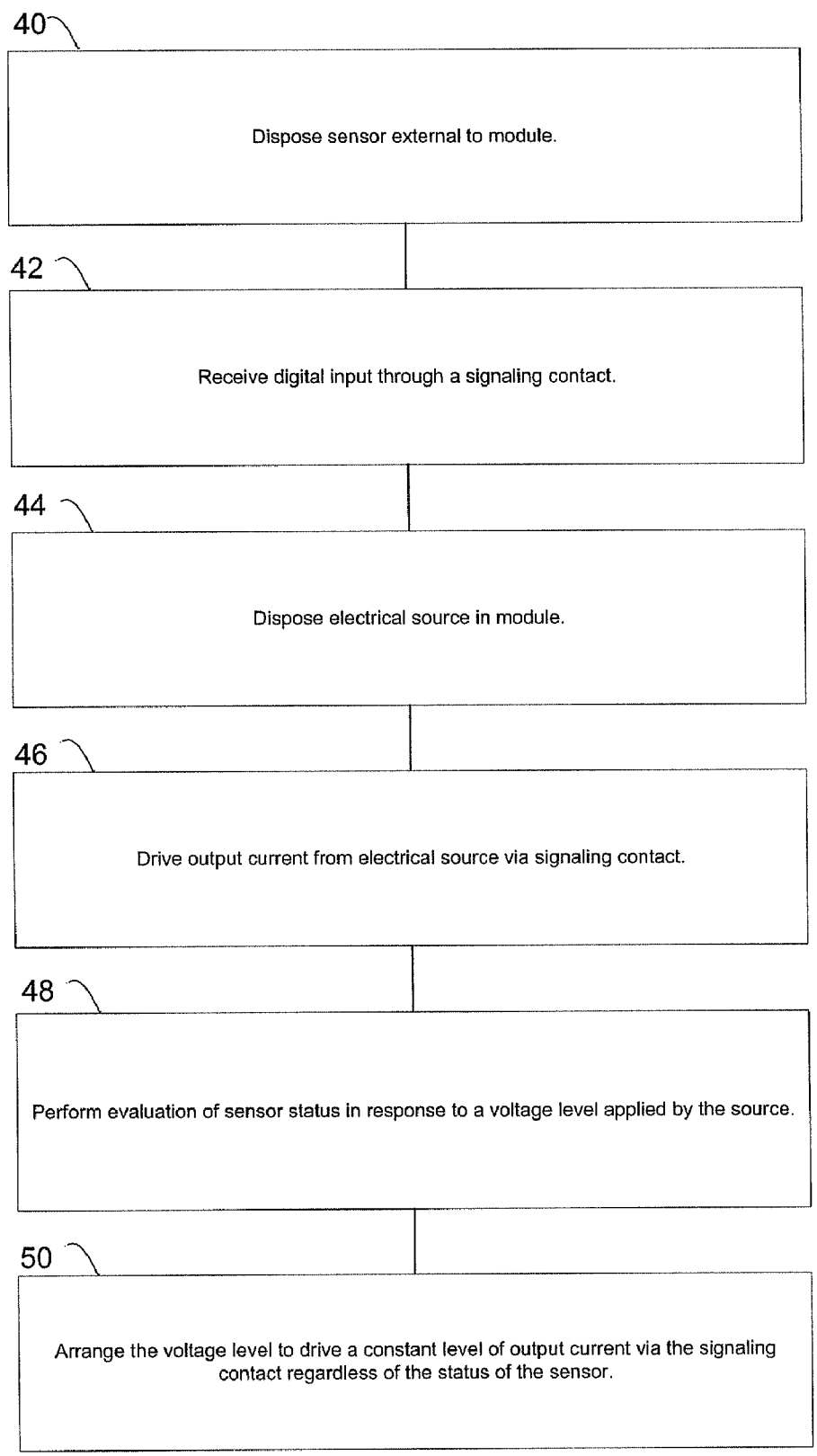
FIG. 4 is a flowchart of a method for operating an input/output module in accordance with aspects of the present invention.

FIG. 4 is a flowchart of a method for operating an input/output module 10 (FIG. 2) for a programmable controller in accordance with aspects of the present invention. As shown in block 40, a sensor 18 (FIG. 2) is disposed external relative to the module. As shown in block 42, a digital input is received through a signaling contact 11 (FIG. 2) connected to the sensor. As shown in block 44, an electrical source 30 (FIG. 2) is internally disposed in the module. As shown in block 46, a current from the electrical source is outputted via the signaling contact. As shown in block 48, an electrically open or an electrically closed status of the sensor is evaluated. As shown in block 50, the evaluation of the sensor status is performed in response to a respective voltage level applied by the electrical source. For example, the respective voltage level applied by the source is arranged to indicate the electrically open or the electrically closed status of the sensor. As shown in block 52, the respective voltage level is arranged to drive a constant level of output current via the signaling contact regardless of the status of the sensor.

The invention can thus be summarized as follows:

A novel concept is specified for input/output modules which comprise at least one digital input channel, wherein in order to prevent power losses previously incurred internally within the module, an electrical source (30) is provided internally within the module for evaluating the status of a sensor (18) connected to the digital input channel, so that the module (10), in contrast to the situation in the prior art, receives no electrical energy via the digital input channel but outputs it and thus achieves a reduction in the power loss incurred internally within the module.

The invention claimed is:

1. An input/output module for a programmable controller comprising:
   a sensor external to the module;
   a signaling contact functioning as a digital input for connecting the sensor to the signaling contact; and
   an electrical source provided internally within the module for evaluating an electrically open or an electrically closed status of the sensor, wherein the evaluating of the sensor status is performed in response to a respective voltage level applied by the electrical source, the respective voltage level applied by the source indicative of the electrically open status or the electrically closed status of the sensor, wherein the voltage level applied by the source is arranged to drive a substantially constant current through the signaling contact regardless of the status of the sensor.

2. The input/output module according to claim 1, wherein the electrical source comprises, means for emitting an electric current via the signaling contact to supply the sensor, wherein the sensor is connected to the signaling contact and a grounding contact at the module end.

3. The input/output module according to claim 1, further comprising, a power supply contact for connecting a supply voltage for supplying the electrical source.

4. The input/output module according to claim 1, wherein the electrical source comprises a clocked constant-current source.

5. The input/output module according to claim 1, wherein the sensor is connected to the signaling contact, and wherein the electrical source comprises processing functionality having means for recognizing the status of the sensor from a voltage required in operating mode for driving a current via the signaling contact.

6. The input/output module according to claim 5, wherein the processing functionality comprises, means for recognizing the status of the sensor, and the module further comprises, an evaluation branch having means for transferring the recognized status of the sensor to a processing unit, wherein the evaluation branch is configured to be triggered depending on the status of the sensor recognized by the processing functionality.

7. The input/output module as claimed in claim 6, wherein the evaluation branch comprises an optocoupler.

8. The input/output module as claimed in claim 7, wherein the module comprises a first part of a circuit and a second part of a circuit, and wherein the optocoupler is provided and positioned so that a metallic isolation is achieved inside the input/output module between a first part of the module circuit, wherein the first part can be influenced externally via the power supply, the signaling contact and the grounding contact, and a second part of the module circuit independent of the first part of the circuit for data processing.

9. The input/output module as claimed in claim 6, wherein the evaluation branch comprises a display element.

10. The input/output module as claimed in claim 6, wherein the evaluation branch comprises an optocoupler and a display element.

11. A method for operating an input/output module for a programmable controller, the method comprising:
    disposing a sensor external relative to the module;
    receiving a digital input through a signaling contact connected to the sensor;
    internally disposing an electrical source in the module;
    outputting a current from the electrical source via the signaling contact;
    evaluating an electrically open or an electrically closed status of the sensor connected to the signaling contact and a grounding contact;
    performing the evaluating of the sensor status in response to respective voltage level applied by the electrical source, the respective voltage level applied by the source being arranged to indicate the electrically open or the electrically closed status of the sensor; and
    arranging the level for driving a constant level of the output current via the signaling contact regardless of the status of the sensor.

12. The method according to claim 11, further comprising prior to the outputting step:
    supplying a supply voltage to the electrical source.

13. The method according to claim 11, further comprising, activating or deactivating an evaluation branch depending an on the evaluated status in order to transfer the recognized status of a sensor to a processing unit which is internal within the module.

14. The method according to claim 13, wherein the activating or deactivating step comprises, activating or deactivating an evaluation branch comprising an optocoupler.

15. The method according to claim 13, wherein the activating or deactivating step comprises, activating or deactivating an evaluation branch comprising an optocoupler and a display element.

16. An input/output module for a programmable controller comprising:
    a sensor external to the module;
    a signaling contact functioning as a digital input for connecting the sensor to the signaling contact, the digital input contact being received through the signaling contact with a zero input current flow and a corresponding zero amount of power dissipation in the module; and an electrical source provided internally within the module; and an evaluation branch in the module, the evaluation branch coupled to the electrical source for evaluating an electrically open or an electrically closed status of the sensor in response to a respective voltage level applied by the electrical source for driving an output current flow via the signaling contact, the respective voltage level applied by the source arranged to indicate the electrically open or the electrically closed status of the sensor, wherein the zero input current flow and the corresponding zero amount of power dissipation reduces power dissipation in the module of the programmable controller, the respective voltage level applied by the source arranged to supply a constant level of the output current through the signaling contact regardless of the status of the sensor.

* * * * *

UNITED STATES PATENT AND TRADEMARK OFFICE
CERTIFICATE OF CORRECTION

| | | |
|---|---|---|
| PATENT NO. | : 7,818,471 B2 | Page 1 of 1 |
| APPLICATION NO. | : 11/527209 | |
| DATED | : October 19, 2010 | |
| INVENTOR(S) | : Werner Engl et al. | |

It is certified that error appears in the above-identified patent and that said Letters Patent is hereby corrected as shown below:

Title Page;
On the patent cover sheet, reference number (75) Inventors, line 1, replace the first line "Wemer Engl, Luhe-Wildenau (DE);" with --Werner Engl, Luhe-Wildenau (DE);--

Signed and Sealed this
First Day of March, 2011

David J. Kappos
*Director of the United States Patent and Trademark Office*